(12) United States Patent
Horisaki et al.

(10) Patent No.: US 6,847,616 B2
(45) Date of Patent: Jan. 25, 2005

(54) RECEPTION APPARATUS FOR ESTIMATING THE STATE OF A TRANSMISSION CHANNEL USING A KNOWN SIGNAL

(75) Inventors: Koji Horisaki, Kanagawa-ken (JP); Kazumi Sato, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 847 days.

(21) Appl. No.: 09/820,937

(22) Filed: Mar. 30, 2001

(65) Prior Publication Data

US 2001/0028632 A1 Oct. 11, 2001

(30) Foreign Application Priority Data

Mar. 31, 2000 (JP) ..................................... 2000-099243

(51) Int. Cl.[7] .......................... G01R 31/08; H03D 1/00
(52) U.S. Cl. ...................... 370/252; 370/503; 375/343
(58) Field of Search ............................. 370/246–249, 370/252, 503, 507–508; 455/63.1, 67.11, 67.13, 114.2, 423; 375/340, 343, 350

(56) References Cited

U.S. PATENT DOCUMENTS

| | | | | |
|---|---|---|---|---|
| 5,263,026 A | * | 11/1993 | Parr et al. | 370/350 |
| 5,533,047 A | * | 7/1996 | Mourot et al. | 375/149 |
| 6,125,124 A | * | 9/2000 | Junell et al. | 370/503 |
| 6,219,334 B1 | * | 4/2001 | Sato et al. | 370/210 |
| 6,473,594 B1 | * | 10/2002 | Piirainen | 455/63.1 |
| 6,512,738 B1 | * | 1/2003 | Namekata et al. | 370/210 |
| 6,711,123 B1 | * | 3/2004 | Taira | 370/208 |

FOREIGN PATENT DOCUMENTS

| | | |
|---|---|---|
| EP | 0 887 976 | 12/1998 |
| EP | 0 996 247 | 4/2000 |
| WO | WO 00/67389 | 11/2000 |

OTHER PUBLICATIONS

R. Muller, et al., "A Low–Overhead Synchronization Scheme for Acquisition in OFDM and Related Transmission Methods," IEEE European Wireless '99, 1999, pp. 235–239 (Abstract Only).

* cited by examiner

Primary Examiner—Chau Nguyen
Assistant Examiner—Andrew Wahba
(74) Attorney, Agent, or Firm—Oblon, Spivak, McClelland, Maier & Neustadt, P.C.

(57) ABSTRACT

A transmission channel response calculation section calculates first to n-th transmission channel responses and stores the calculated first to n-th transmission channel responses in a memory section. A correlation calculation section obtains correlation values of the second to n-th transmission channel responses to the first transmission channel responses, respectively, and outputs the obtained correlation values to a transmission channel response synthesis section. The transmission channel response synthesis section gives weights according to the correlation values, weight-synthesizes the first to n-th transmission channel responses, and obtains a synthesized transmission channel response. An influence of noise on the synthesized transmission channel response is reduced. A distortion compensation section eliminates a distortion of the reception signal using the synthesized transmission channel response. Thus, it is made possible to calculate a transmission channel response without being influenced by the noise of a receiver and to ensure eliminating a transmission channel distortion.

13 Claims, 13 Drawing Sheets

RECEPTION APPARATUS FOR ESTIMATING THE STATE OF A TRANSMISSION CHANNEL USING A KNOWN SIGNAL

BACKGROUND OF THE INVENTION

1. Field of the Invention

The present invention relates to a reception apparatus suited for a base station, a terminal station or the like of a radio data transmission system for estimating the state of a transmission channel using a known signal.

2. Related Art Statement

At present, demand for cellular phones, radio LANs and the like rises and a radio communication system plays a very significant role.

The radio data transmission system is quite advantageous over a wire data transmission system in portability, easiness of installation, cost and the like. However, since the radio data transmission system transmits data through radio transmission, the state of a transmission channel has a great change even while communication is being held and the system is influenced by a multiple reflected radio wave propagation (multi-path). Due to this, the communication quality of the system sometimes deteriorates greatly.

Considering this, a method of transmitting a known signal (preamble) prior to or posterior to a signal for transmitting information is often adopted. According to this method, a reception side measures a transmission channel response from a reception preamble and compensates for a distortion given to a signal on the transmission channel using an estimated transmission channel response based on a measurement result.

As can be seen, a technique for transmitting a preamble to estimate a transmission channel and for allowing a reception side to estimate the state of the transmission channel based on a reception result, is an effective method for the reception side to eliminate an influence on the signal on the transmission channel.

This method, however, has disadvantages in that a reception preamble is unavoidably influenced by the noise of a receiver and the state of a transmission channel cannot accurately grasped.

OBJECT AND SUMMARY OF THE INVENTION

It is an object of the present invention to provide a reception apparatus capable of reducing the influence of noise at a receiver, acquiring an accurate transmission channel response and ensuring the removal of a transmission channel distortion by using a plurality of reception preambles.

A reception apparatus according to the present invention comprises a transmission channel response calculation section calculating a transmission channel response from a reception signal and a reference signal; a decision section determining reliabilities of a plurality of transmission channel responses calculated using reception signals received at different time periods, and deciding on a weight synthesis method; a transmission channel response synthesis section applied with the plurality of transmission channel responses calculated using the reception signals received at the different time periods, weight-synthesizing the plurality of transmission channel responses based on the weight synthesis method decided by the decision section, and obtaining a synthesized transmission channel response; and a distortion compensation section compensating for a distortion of the reception signal using the synthesized transmission channel response.

The other features and advantages of the present invention will become readily apparent from the description will follows.

DETAILED DESCRIPTION OF THE PREFERRED EMBODIMENTS

Figure 1:
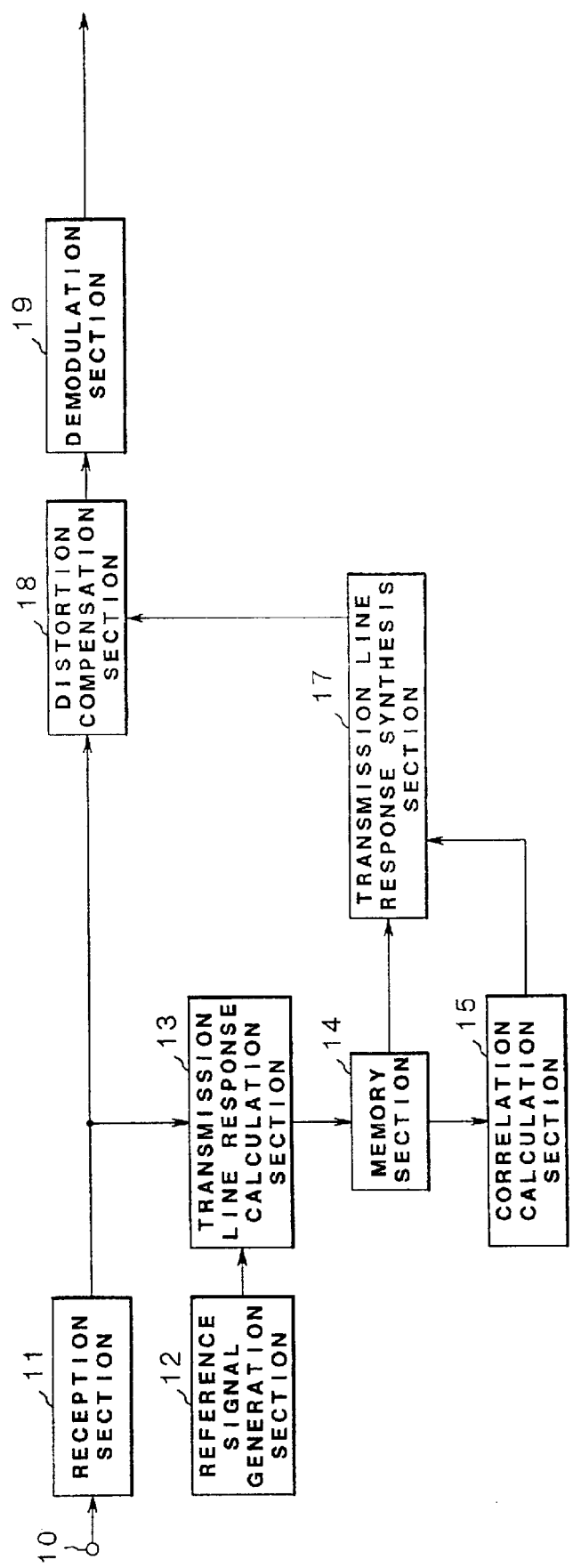
FIG. 1 is a block diagram showing one embodiment of a reception apparatus according to the present invention.

The embodiments of the present invention will be described hereinafter in detail with reference to the accompanying drawings. FIG. 1 is a block diagram showing an embodiment of a reception apparatus according to the present invention.

Figure 2:
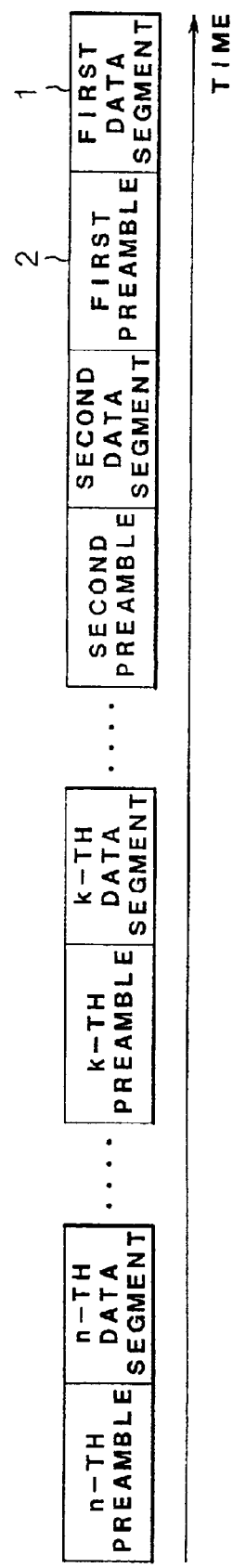
FIG. 2 is an explanatory view showing a transmission signal format.

In FIG. 1, transmission signals including preambles is inputted into an input terminal 10. FIG. 2 is an explanatory view showing the format of the transmission signals inputted into the input terminal 10.

As shown in FIG. 2, data to be transmitted are arranged in data segments and preambles are arranged in preamble segments. Each preamble is arranged in front of a data segment. In an example of FIG. 2, the first, second, third . . . data segments are arranged sequentially and the first, second, third, . . . preamble segments are provided just in front of the respective data segments.

Data to be demodulated is data transmitted by the first data segment. A preamble received just before the first data segment is the first preamble. A preamble received at an earlier time than and the closest time to that of the first preamble is the second preamble and the second closest preamble is the third preamble. Likewise, the k-th preamble received at an earlier time than that of the data of the first data segment is the k-th preamble. Right after the k-th preamble, the k-th data segment is provided.

In this embodiment, as described later, a plurality of preambles are used to demodulate the first data segment. In that case, the number of preambles used for the demodulation of the first data segment is limited, in which case first to the n-th preambles are taken into consideration, where n is a natural number equal to or greater than 2.

The transmission signals inputted through the input terminal 10 are supplied to a reception section 11. The reception section 11 has basic processing functions, such as an amplification processing, a frequency mixture processing and a band limitation processing, as well as a synchronization function, a frequency correction function and the like necessary to obtain a base band signal from a radio frequency band signal. The reception section 11 conducts these processings to the inputted transmission signals and then outputs the reception signals of the base band signal.

A reference signal generation section 12 generates a transmission preamble which is a known signal, and outputs the transmission preamble as a reference signal corresponding to each reception signal outputted from the reception section 11.

A transmission channel response calculation section 13 calculates and outputs a transmission channel response using a reception signal and a reference signal. Namely, the transmission channel response calculation section 13 calculates the k-th transmission channel response from the k-th preamble (see FIG. 2). To be specific, the transmission channel response calculation section 13 calculates the k-th transmission channel response hk(l) from a sample value rk(l) at the time of the k-th preamble and the sample value $s^{-i}$ of the inverse function of a corresponding transmission preamble as a sample number L by the following formula (1):

$$h_k(l) = \sum_{L=0}^{l} r_k(L) \cdot s^{-1}(l - L). \quad (1)$$

The transmission channel response calculation section 13 outputs the calculated k-th transmission channel response to a memory section 14. The memory section 114 stores transmission channel responses sequentially inputted and outputs the stored transmission channel responses to a transmission channel synthesis section 17 and a correlation calculation section 15. It is noted that there is a limit to the number of transmission channel responses stored in the memory section 14. If the number of inputted transmission channel responses exceeds the limit, the oldest transmission channel response received is deleted and a new input is stored. In addition, the first transmission channel response may be directly supplied to the correlation calculation section 15 and the transmission channel response synthesis section 17 without being supplied to the memory section 14.

In this embodiment, not a single transmission channel response but a plurality of transmission channel responses are used to compensate for a distortion during transmission. Namely, among the first to n-th transmission channel responses obtained from the first to n-th preambles, at least one transmission channel response is used to compensate for a distortion given to the data in the first data segment on a transmission channel.

The transmission channel response synthesis section 17 synthesizes, for example, the first transmission channel response h1(l) to the n-th transmission channel response hn(l) and thereby calculates a synthesized transmission channel response to compensate for a transmission channel distortion.

Further, in this embodiment, if the transmission channel response synthesis section 17 synthesizes transmission channel responses, the respective transmission channel responses are given weights and added together. The level of the reliability of each transmission channel response is determined and a weight coefficient is decided in accordance with a determination result. In this embodiment, the reliability is obtained using the correlations between the respective transmission channel responses and the correlations are calculated by the correlation calculation section 15.

Figure 3:
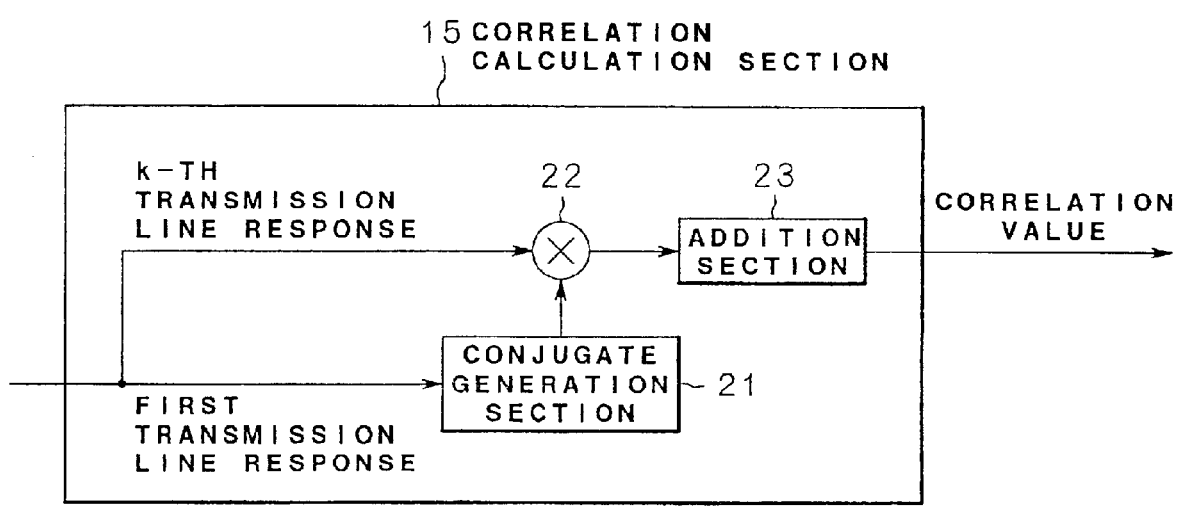
FIG. 3 is a block diagram showing the concrete constitution of a correlation calculation section 15 shown in FIG. 1.
Figure 4:
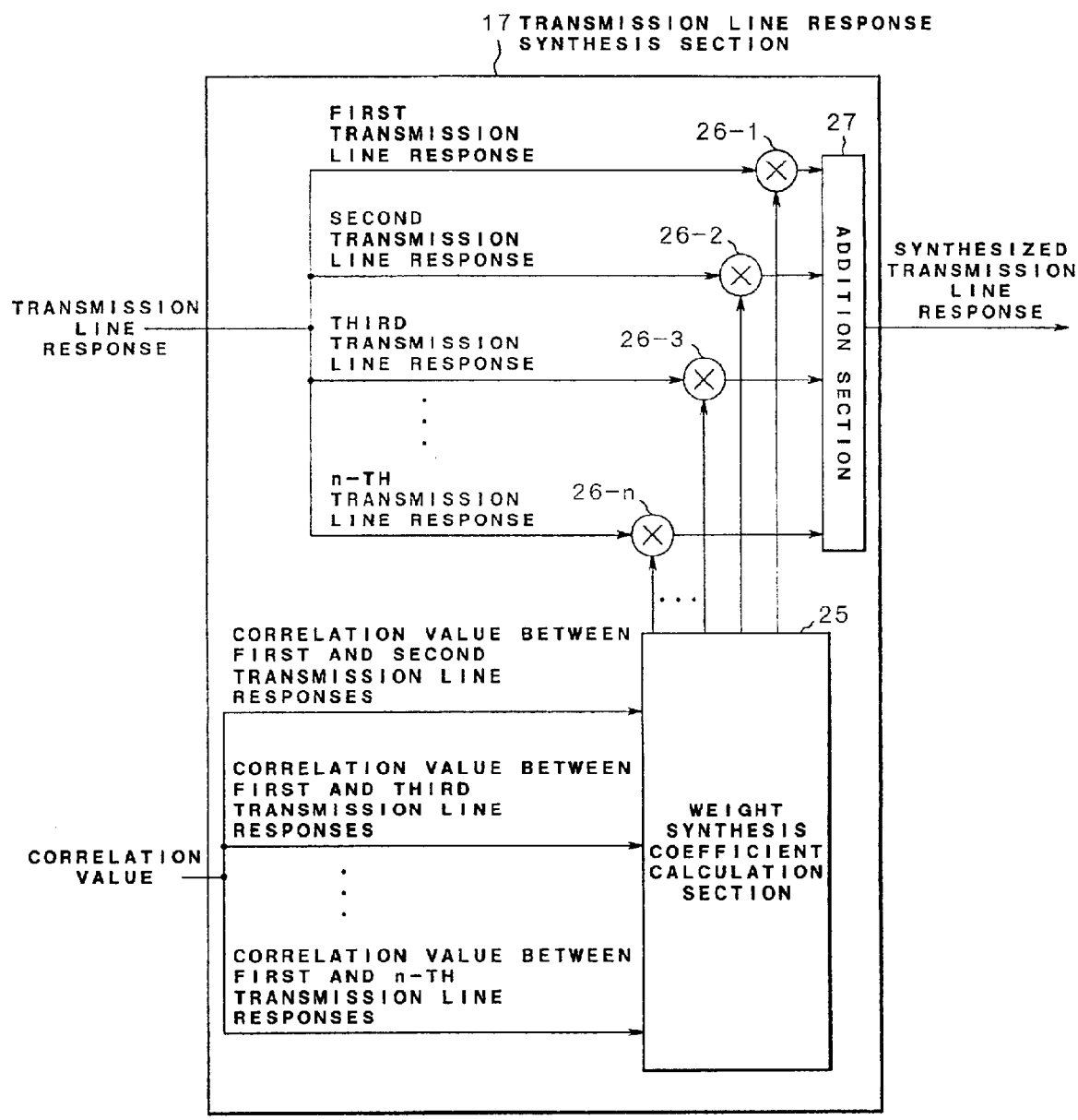
FIG. 4 is a block diagram showing the concrete constitution of a transmission channel response synthesis section 17 shown in FIG. 1.

FIGS. 3 and 4 are block diagrams showing one example of the concrete constitutions of the correlation calculation section 15 and the transmission channel response synthesis section 17 shown in FIG. 1, respectively.

In FIG. 3, the correlation calculation section 15 consists of a conjugate generation section 21, a multiplier 22 and an addition section 23.

The first transmission channel response and the k-th transmission channel responses sequentially calculated on the transmission channel response calculation section 13 are inputted into the correlation calculation section 15. The first transmission channel response is supplied to the conjugate generation section 21, while the k-th transmission channel response is supplied to the multiplier 22. The conjugate generation section 21 obtains the complex conjugate of the signal series of the first transmission channel response and outputs the obtained complex conjugate to the multiplier 22. The multiplier 22 multiplies the complex of the signal series of the k-th transmission channel response by that of the signal series from the conjugate generation section 21 and outputs an operation result to the addition section 23. The addition section 23 adds the outputs of the multiplier 22 together and outputs an addition result as the correlation value between the first and k-th transmission channel responses.

That is, while assuming that a series length is L and the signal series of the first and k-th transmission channel responses are r1(l) and rk(l) (where l=0, 1, . . . , L), respectively, the correlation calculation section 15 outputs the correlation value Clk between the first transmission channel response and the k-th transmission channel response by an arithmetic operation shown in (2) below:

$$C_{lk} = \sum_{l=0}^{L} P_l^*(l) \cdot P_k(l). \quad (2)$$

The correlation calculation section 15 obtains the respective correlation values C11 to Cln between the first transmission channel response and the second to n-th transmission channel responses, respectively by a product sum arithmetic operation shown in the formula (2) above, and outputs the obtained the correlation values C12 to Cln to the transmission channel response synthesis section 17.

In FIG. 4, the transmission channel response synthesis section 17 consists of a weight synthesis coefficient calculation section 25, multipliers 26-1 to 26-n and an addition section 27. The correlation values C12 to Cln are inputted into the weight synthesis coefficient calculation section 25. The weight synthesis coefficient calculation section 25 calculates a weight synthesis coefficient used to synthesize transmission channel responses using the correlation values C12 to Cln. For example, the weight synthesis coefficient calculation section 25 obtains a weight synthesis coefficient ak by which the k-th transmission channel response is multiplied by an arithmetic operation shown in the following formula (3) using the correlation value Clk (k=1, 2, ... n) between the first and k-th transmission channel responses:

$$a_k = \frac{|C_{lk}|}{\sum_{i=1}^{n} |C_{li}|^2}. \quad (3)$$

The weight synthesis coefficient calculation section 25 applies obtained addition coefficients a1, a2, ..., an to the multipliers 26-1 to 26-n, respectively. The multipliers 26-1 to 26-n are applied with the first to n-th transmission channel responses h1 (l) to hn(l), respectively, from the memory section 14, multiply two inputs, respectively and output multiplication results to the addition section 27. The addition section 27 adds the outputs of the multipliers 26-1 to 26-n together and outputs an addition result as a synthesized transmission channel response.

Namely, the transmission channel response synthesis section 17 obtains the synthesized transmission channel response h(l) by an arithmetic operation shown in the following formula (4):

$$h(l) = \sum_{k=1}^{n} a_k \cdot h_k(l). \quad (4)$$

The transmission channel response synthesis section 17 outputs the obtained synthesized transmission channel response h(l) to a distortion compensation section 18. The distortion compensation section 18 is applied with the reception signal from the reception section 11, compensates for the distortion of the reception signal using the synthesized transmission channel response and outputs a transmission signal from which the transmission channel distortion is eliminated, to the demodulation section 19. The following formula (5) shows the arithmetic operation conducted by the distortion compensation section 18. In the formula (5), rk( ) indicates the sample value of a reception signal, h( ) indicates a synthesized transmission channel response, and x(l) indicates the reception signal after a distortion compensation:

$$x(l) = \sum_{L=0}^{l} r_k(L) \cdot h^{-1}(l - L). \quad (5)$$

The demodulation section 19 demodulates the reception signal after the distortion compensation which is outputted from the distortion compensation section 18 and outputs a demodulated code series.

Next, the operation of the embodiment constituted as stated above will be described.

The transmission signals inputted through the input terminal 10 are supplied to the reception section 11. The transmission signals are formed in a format shown in FIG. 2. The reception section 11 conducts a predetermined reception signal processing to the transmission signal and outputs reception signals to the transmission channel response calculation section 13. On the other hand, the reference signal generation section 12 generates the same known transmission preambles as those included in the transmission signals and outputs the generated preambles, as reference signals to the reception signals, to the transmission channel response calculation section 13.

It is now assumed that the first data segment and the first preamble shown in FIG. 2 are received. The transmission channel response calculation section 13 calculates the first transmission channel response h1 (l) corresponding to the first data segment and outputs the calculated first transmission channel response h1 (l) to the memory section 14 by the calculation of the above-stated formula (1). The memory section 14 stores the first transmission channel response. It is noted that the transmission channel response calculated by the transmission channel response calculation section 13 is influenced by noise since the noise of a receiver is added to the reception signals.

Likewise, the transmission channel response calculation section 13 sequentially calculates the second, third, ... transmission channel responses and outputs the calculated responses to the memory section 14. The memory section 14 outputs the first transmission channel response and the second, third, ... transmission channel responses to the correlation calculation section 15.

The correlation calculation section 15 calculates the correlation value between the first and the k-th transmission channel responses by the above-stated formula (2). That is, the correlation calculation section 15 obtains correlation values C12 to Cln between the first transmission channel response and the second and the following transmission channel responses, respectively, inputted sequentially and outputs the obtained correlation values C12 to Cln to the transmission channel response synthesis section 17.

The weight synthesis coefficient calculation section 25 of the transmission channel response synthesis section 17 calculates a weight synthesis coefficient ak by which the k-th transmission channel response is multiplied from the inputted respective correlation values C12 to Cln by the above-stated formula (3). Since the first to n-th transmission channel responses are inputted into the transmission channel response calculation section 17 from the memory section 14, the transmission channel response calculation section 17 multiplies these transmission channel responses by weight synthesis coefficients a1, a2, ... an, respectively, and outputs multiplication results to the addition section 27. The addition section 27 adds these multiplication results together and calculates a synthesized transmission channel response indicated by the above-stated formula (4).

The synthesized transmission channel response from the transmission channel synthesis section 17 is calculated using a plurality of preambles received at a plurality of time periods and the influence of the noise of the receiver on the synthesized transmission channel response is greatly reduced. Further, the weight synthesis coefficients used for obtaining the synthesized transmission channel response are decided according to the correlation values between the transmission channel responses based on a plurality of preambles. A heavier weight is given to a transmission channel response having higher reliability, thereby enhancing the reliability of the synthesized transmission channel response.

The distortion compensation section 18 eliminates a transmission channel distortion from the reception signal in the first data segment using the synthesized transmission channel response from the transmission channel response synthesis section 17 by the arithmetic operation shown in the above-stated formula (5). The reception signal the distortion of which has been compensated is applied to and demodulated by the demodulation section 19.

As can be seen, in this embodiment, using the synthesized transmission channel response obtained by synthesizing a plurality of transmission channel responses using a plurality of preambles, the transmission channel distortion of the reception signal is eliminated and the influence of the noise of the receiver on the synthesized transmission channel response is greatly reduced. It is, therefore, possible to ensure eliminating the transmission channel distortion. Further, at the time of obtaining the synthesized transmission channel response, the weight synthesis coefficients based on the correlation values between the transmission channel responses are used, so that the synthesized transmission channel response has high reliability.

Meanwhile, as a transmission channel response synthesis method in the above-stated embodiment, various methods for the arithmetic operations of the formulas (2) to (4) stated above are considered. For example, the synthesized transmission channel response may be obtained by selecting transmission channel responses equal to or higher than a predetermined correlation value, or weight synthesis coefficients may be obtained from signal intensities, code errors or the like without obtaining correlation values.

Figure 5:
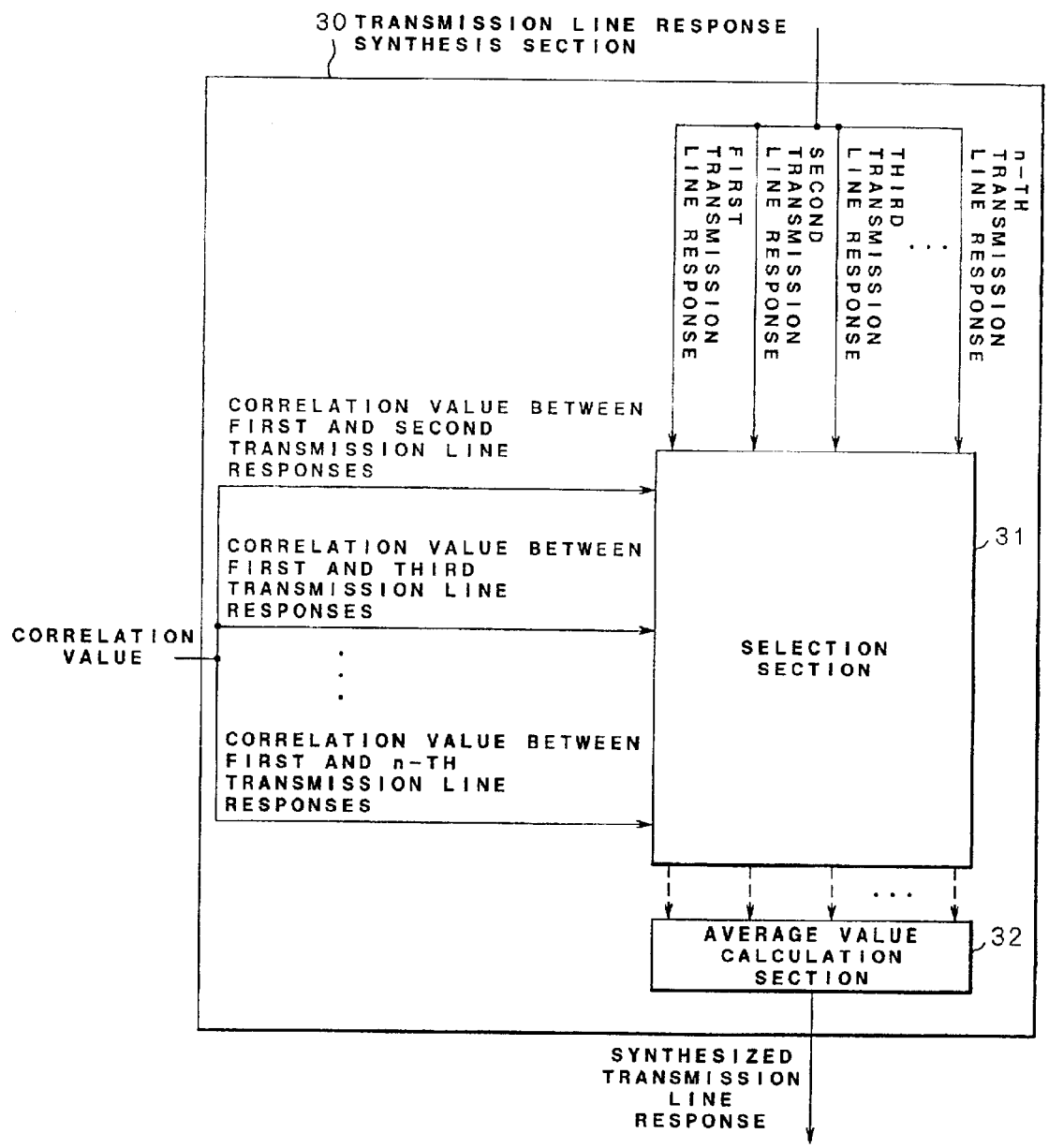
FIG. 5 is a block diagram showing a transmission channel response synthesis section adopted in another embodiment of the present invention.

FIG. 5 is a block diagram showing a transmission channel response synthesis section adopted in another embodiment of the present invention. This embodiment shows a case of obtaining a synthesized transmission channel by selecting a plurality of transmission channel responses based on correlation values.

This embodiment differs from the embodiment shown in FIG. 1 in that a transmission channel response synthesis section 30 instead of the transmission channel response synthesis section 17 is provided. The transmission channel response synthesis section 30 consists of a selection section 31 and an average value calculation section 32. Correlation values C12 to Cln are inputted from the correlation calculation section 15 (see FIG. 1) and the first to n-th transmission channel responses are inputted from the memory section 14 into the selection section 31.

In the selection section 31, the threshold value of correlation values is preset, transmission channel responses having higher correlation values with the first transmission channel response than the threshold value are selected from among the second to n-th transmission channel responses and the selected transmission channel responses are outputted to the average value calculation section 32.

The transmission channel responses selected by the selection section 31 and the first transmission response are inputted into the average value calculation section 32. The average value calculation section 32 calculates the average value of the inputted transmission channel responses and outputs a calculation result, as a synthesized transmission channel response, to the distortion compensation section 18.

In this embodiment constituted as stated above, as in the case of the embodiment shown in FIG. 1, the transmission channel response synthesis section 30 is supplied with the first to n-th transmission channel responses from the memory section 14 and the correlation values C12 to Cln from the correlation calculation section 15. The transmission channel response synthesis section 30 selects transmission channel responses having higher correlation values with the first transmission channel response than the threshold value in the selection section 31. The average value calculation section 32 calculates the average value of these selected transmission channel responses. The transmission channel response synthesis section 30 applies the output of the average value calculation section 32, as a synthesized transmission channel response, to the distortion compensation section 18.

Since the transmission channel responses having higher correlation values than the threshold value are selected and the average value thereof is used for obtaining the synthesized transmission channel response, the synthesized transmission channel response has high reliability.

As can be seen from the above, in this embodiment, the apparatus can generate a synthesized transmission channel response from the transmission channel responses having high reliability and enhance the reliability of the transmission channel responses used for the compensation of a distortion given to the reception signal on the transmission channel although the constitution thereof is simpler than that of the apparatus in the embodiment shown in FIG. 1.

Figure 6:
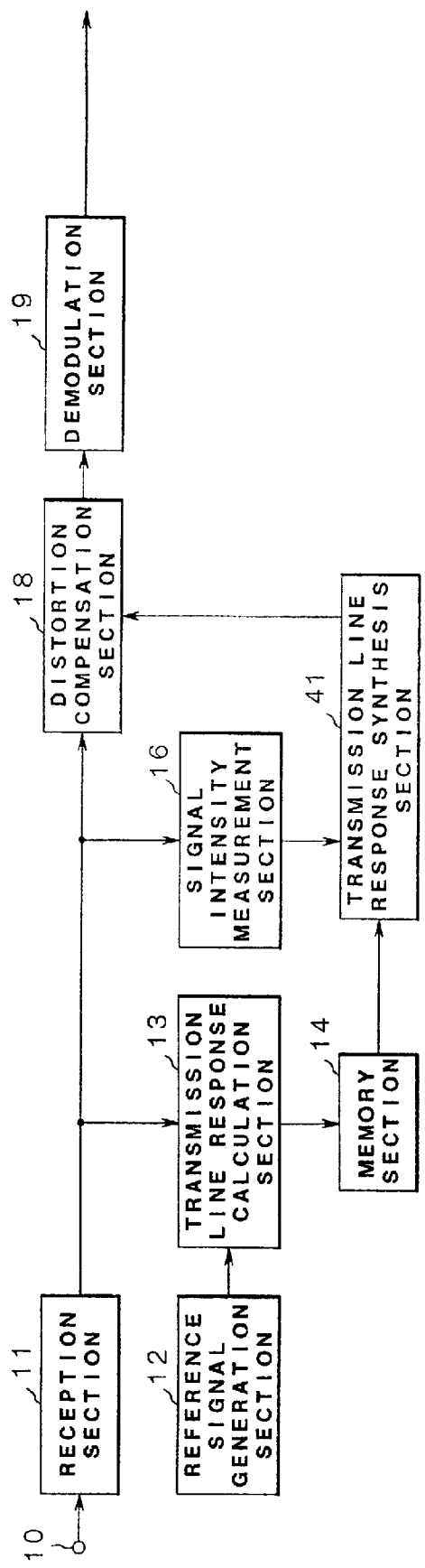
FIG. 6 is a block diagram showing another embodiment of the present invention.

FIG. 6 is a block diagram showing another embodiment of the present invention. In this embodiment, the transmission channel responses are synthesized based on the signal intensity. In FIG. 6, the same constituent elements as those in FIG. 1 are denoted by the same reference symbols, which elements will not be described herein.

This embodiment differs from the embodiment shown in FIG. 1 in that the correlation calculation section 15 is deleted and a signal intensity measurement section 16 is provided and that the constitution of the transmission channel response synthesis section is changed.

The signal intensity measurement section 16 measures the average power of a predetermined segment of reception signals outputted from a reception section 11 and outputs a measurement result to a transmission channel response synthesis section 41. For example, the signal intensity measurement section 16 measures the signal intensities of the first to n-th preambles and outputs measurement results.

Figure 7:
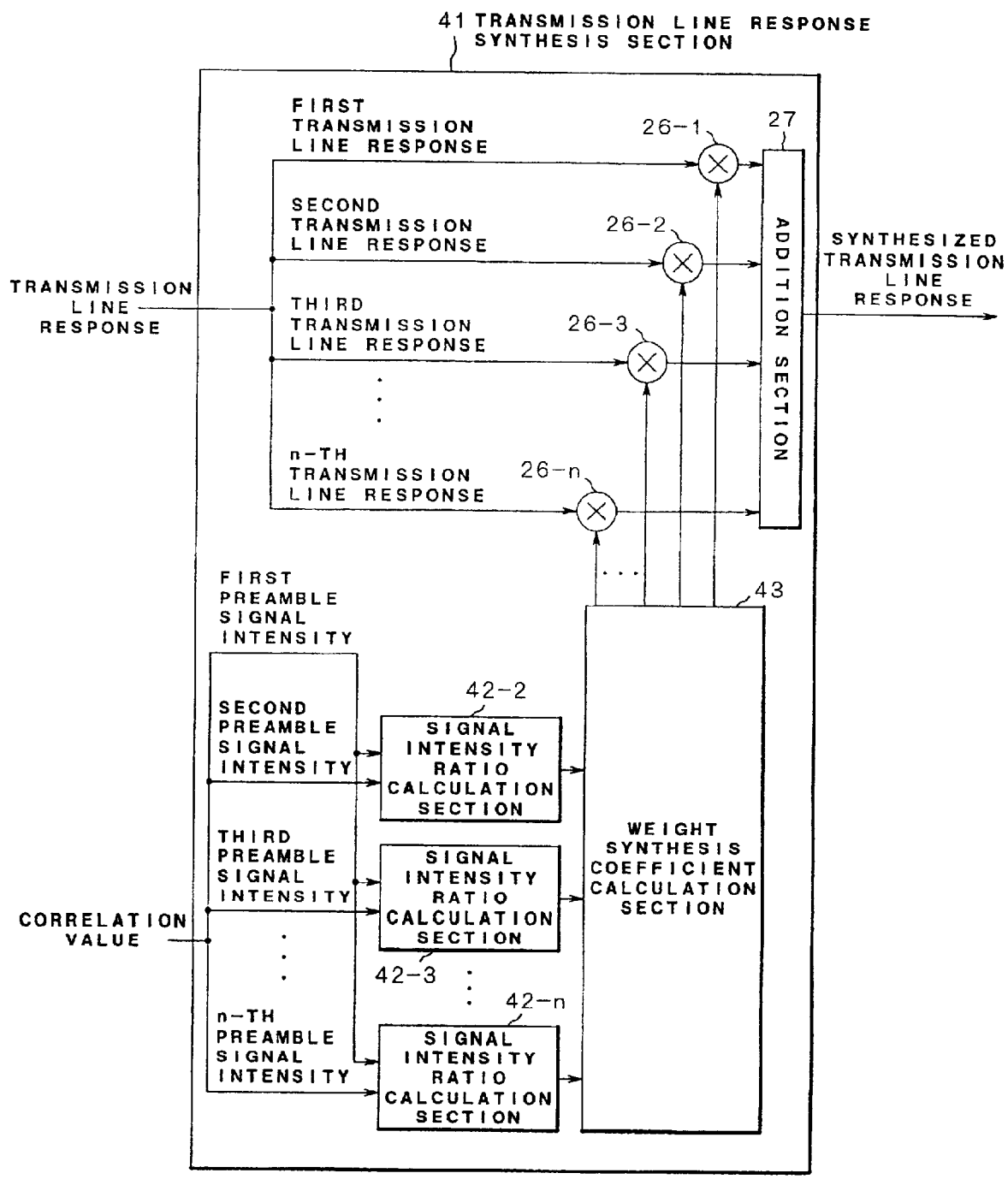
FIG. 7 is a block diagram showing the concrete constitution of a transmission channel response synthesis section 41 shown in FIG. 6.

FIG. 7 is a block diagram showing an example of the concrete constitution of a transmission channel response synthesis section 41 shown in FIG. 6. In FIG. 7, the same constituent elements as those in FIG. 4 are denoted by the same reference symbols, which elements will not be described herein.

The transmission channel response synthesis section 41 consists of signal intensity ratio calculation sections 42-2 to 42-n, a weight synthesis coefficient calculation section 43, multipliers 26-1 to 26-n and an addition section 27. The signal intensity ratio calculation sections 42-2 to 42-n are applied with the signal intensities of the first preamble from the signal intensity measurement section 16. The signal intensity ratio calculation sections 42-2 to 42-n are applied with the signal intensities of the second to n-th preambles, respectively. The signal intensity ratio calculation section 42-2 to 42-n obtain the ratios of the second to n-th preambles to the first preamble and output intensity ratios to the weight synthesis coefficient calculation section 43, respectively.

The weight synthesis coefficient calculation section 43 calculates weight synthesis coefficients by which the first to n-th transmission channel responses are multiplied based on the signal intensities ratio and output calculation results to the multipliers 26-1 to 26-n, respectively.

For example, the weight synthesis coefficient calculation section 43 obtains a weight synthesis coefficient ak by which the k-th transmission channel response is multiplied by an arithmetic operation shown in the following formula (6) using a signal intensity ratio Slk (k=1, 2, ... n) of the first preamble to the k-th preamble:

$$a_k = \frac{1/S_{lk}}{\sum_{i=1}^{n} 1/S_{li}} \quad (6)$$

Next, the operation of the embodiment constituted as stated above will be described.

Reception signals from the reception section 11 are supplied to the transmission channel response calculation section 13, in which transmission channel responses are calculated, and also supplied to the signal intensity measurement section 16, in which the signal intensities of the respective preambles are measured. The transmission channel responses calculated from the respective preambles are supplied to the transmission channel response synthesis section 41. Also, the signal intensities of the respective preambles are supplied to the transmission channel response synthesis section 41.

The transmission channel response synthesis section 41 obtains the intensity ratios of the signal intensity of the first preamble to those of the second to n-th preambles in the signal intensity ratio calculation sections 42-2 to 42-n, respectively. The weight synthesis coefficient calculation section 43 calculates by an arithmetic operation in the above-stated formula (6) weight synthesis coefficients so that the transmission channel response calculated from a preamble having a higher signal intensity ratio with the fist preamble is multiplied by a lower weight synthesis coefficient.

The multipliers 26-1 to 26-n multiply the first to n-th transmission channel responses by the weight synthesis coefficients, respectively and the addition section 27 adds the multiplication results together, whereby a synthesized transmission channel response is obtained as in the case of FIG. 4.

The other functions are the same as those in the embodiment shown in FIG. 1.

As can be seen, in this embodiment, the weight synthesis coefficients are decided based on the signal intensities of the preambles and the transmission channel responses obtained from a plurality of preambles are synthesized based on the respective weight synthesis coefficients, thereby obtaining a synthesized transmission channel response on which the influence of the noise of the receiver is reduced. Thus, the same advantages as those in the first embodiment shown in FIG. 1 can be obtained.

In this embodiment, the transmission channel response synthesis section 41 compares signal intensities based on the signal intensity ratios. It is obvious that signal intensity differences instead of the signal intensity ratios can be applied.

Figure 8:
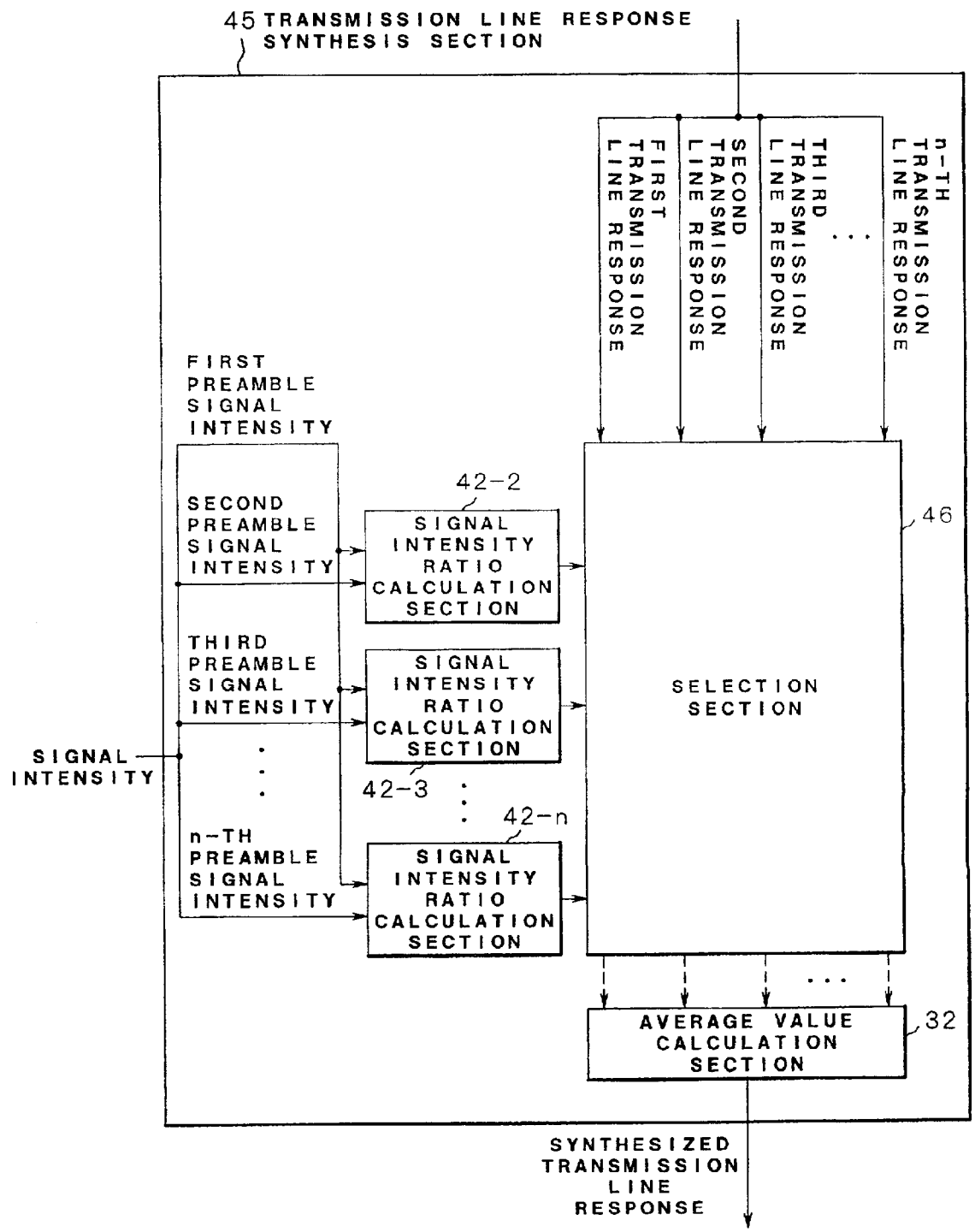
FIG. 8 is a block diagram showing a transmission channel response synthesis section adopted in another embodiment of the present invention.

FIG. 8 is a block diagram showing a transmission channel response synthesis section adopted in another embodiment of the present invention. In this embodiment, a transmission channel response synthesis section 45 for selecting transmission channel responses used for the calculation of a synthesized transmission channel response in accordance with signal intensity is adopted. In FIG. 8, the same constituent elements as those in FIGS. 5 and 7 are denoted by the same reference symbols, which elements will not be described herein.

The transmission channel response synthesis section 45 consists of signal intensity ratio calculation sections 42-2 to 42-n, a selection section 46 and an average value calculation section 32. The selection section 46 is applied with the outputs of the signal intensity ratio calculation sections 42-2 to 42-n and applied with the first to n-th transmission channel responses from a memory section 14.

In the selection section 46, the threshold value of signal intensity ratios is preset. Transmission channel responses having lower signal intensity ratios with the first transmission channel response than the threshold value are selected from among the second to n-th transmission channel responses and the selected transmission channel responses are outputted to the average value calculation section 32.

In the embodiment constituted as stated above, the transmission channel response synthesis section 45 selects transmission channel responses having lower signal intensity ratios with the first transmission channel response than the threshold value in the selection section 46 and calculates the average value of the selected transmission channel responses in the average value calculation section 32. The transmission channel response synthesis section 45 applies the output of the average value calculation section 33, as a synthesized transmission channel response, to a distortion compensation section 18.

Since the transmission channel responses having lower signal intensity ratios than the threshold value are selected and the average value thereof is used for obtaining a synthesized transmission channel response, the synthesized transmission channel response has high reliability.

As can be seen, in this embodiment, while the apparatus is simpler in constitution than the apparatus in the embodiment shown in FIG. 6, the apparatus can generate the synthesized transmission channel response from the transmission channel responses having high reliability and the reliability of the transmission channel responses used for the compensation of a distortion given to the reception signal on the transmission channel can be enhanced.

Figure 9:
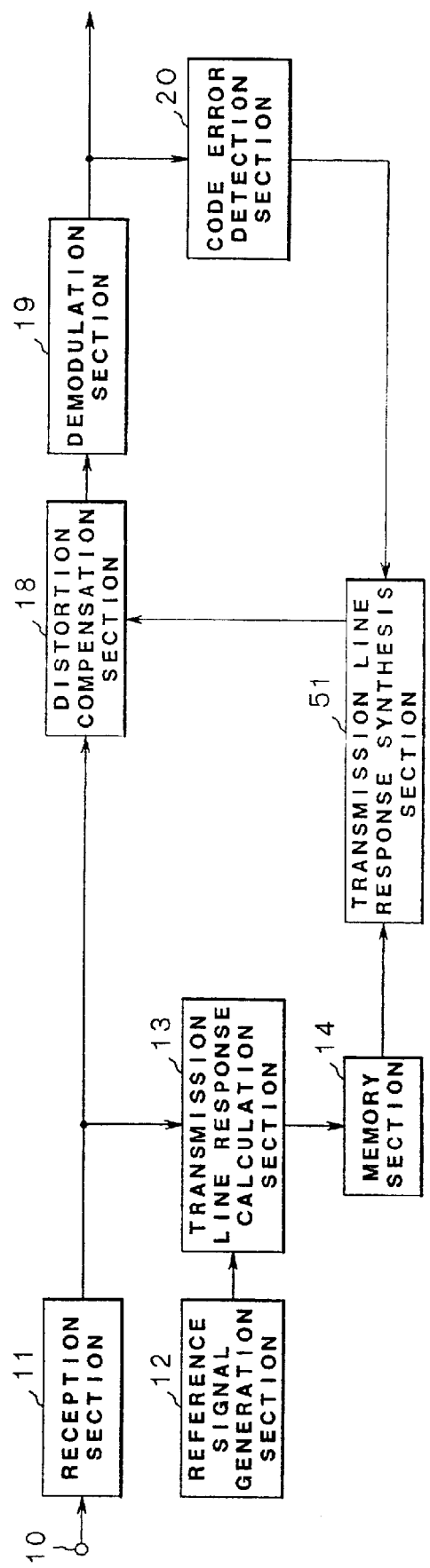
FIG. 9 is a block diagram showing another embodiment of the present invention.

FIG. 9 is a block diagram showing another embodiment of the present invention. In this embodiment, transmission channel responses are synthesized based on code errors. In FIG. 9, the same constituent elements as those in FIG. 1 are denoted by the same reference symbols, which elements will not be described herein.

This embodiment differs from the embodiment shown in FIG. 1 in that the correlation calculation section 15 is deleted and a code error detection section 20 is provided and that the constitution of a transmission channel synthesis section is changed.

The code error detection section 20 is applied with the outputs of a demodulation section 19, detects code errors included in the code series of demodulation signals from the demodulation section 19, and outputs detection results to the transmission channel response synthesis section 51.

Figure 10:
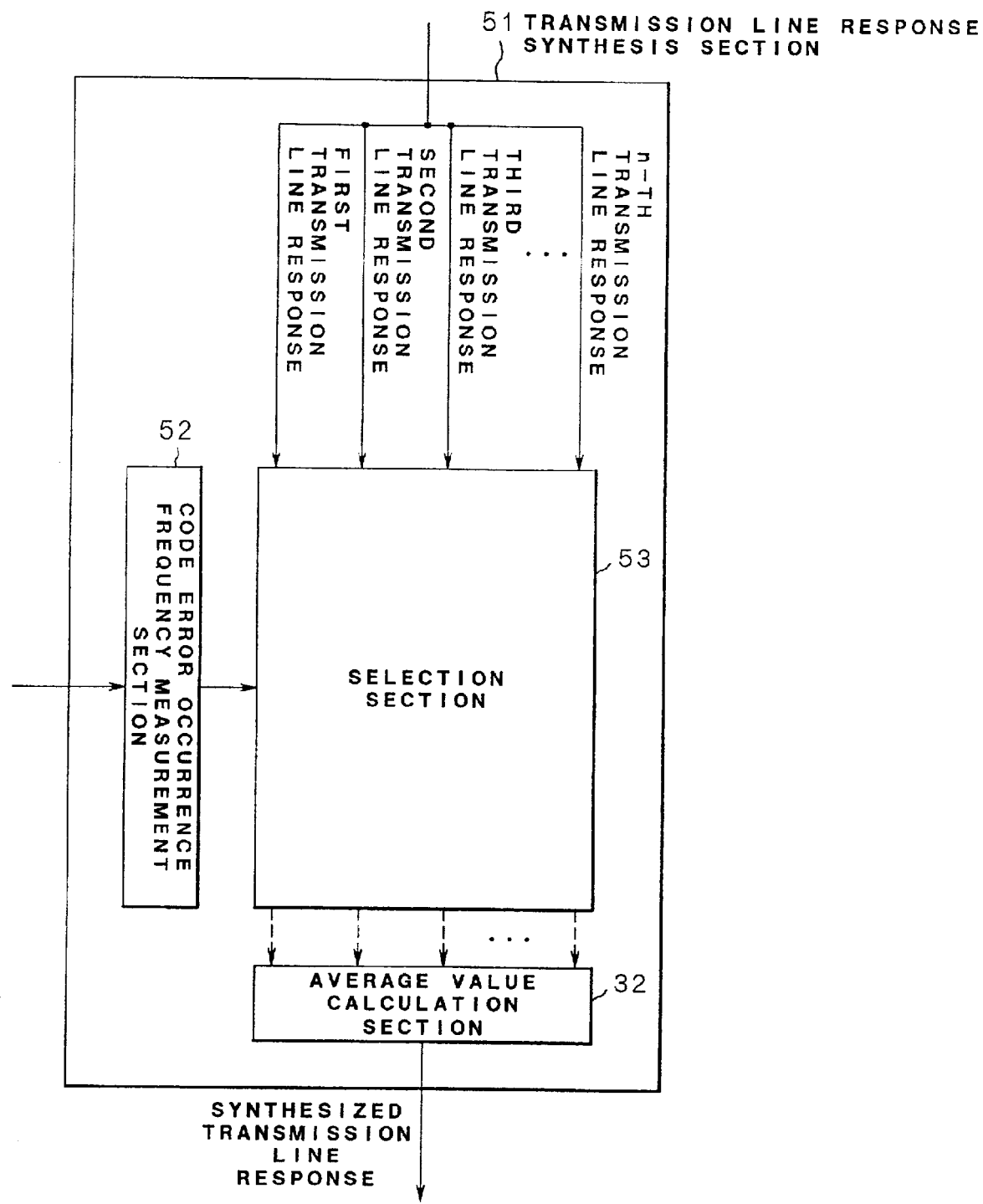
FIG. 10 is a block diagram showing the concrete constitution of a transmission channel response synthesis section 51 shown in FIG. 9.

FIG. 10 is a block diagram showing the concrete constitution of the transmission channel response synthesis section 51 shown in FIG. 9. In FIG. 10, the same constituent elements as those in FIG. 5 are denoted by the same reference symbols, which elements will not be described herein.

The transmission channel response synthesis section 51 consists of a code error occurrence frequency measurement section 52, a selection section 53, and an average value calculation section 32. The code error occurrence frequency measurement section 52 measures the code error occurrence frequencies of respective data segments (see FIG. 2) and outputs measurement results to the selection section 53. The selection section 53 has a preset threshold value of code error occurrence frequencies, selects the first to (k-1)th transmission channel responses only if all of the code error occurrence frequencies of the second to k-th data segments are equal to or lower than the preset threshold value and supplies the selected transmission channel responses to the average value calculation section 32. It is noted that the selection section 53 selects a maximum number of transmission channel responses satisfying a selection criterion and never fails to select the first transmission channel response.

Next, the operation of the embodiment constituted as stated above will be described.

Reception signals from the reception section 11 are supplied to the transmission channel response calculation section 13, in which transmission channel responses are calculated. The outputs of the demodulation section 19 are supplied to the code error detection section 20, in which code errors are detected. Code error detection results are supplied to the code error occurrence frequency section 52 of the transmission channel response synthesis section 51.

The code error occurrence frequency measurement section 52 measures the code error occurrence frequencies of the respective data segments and outputs measurement results to the selection section 53. The selection section 53 selects the first to (k-1)th transmission channel responses if the code error occurrence frequencies of the first to k-th data segments are equal to or lower than the predetermined threshold value and outputs the average value calculation section 32.

Namely, only the transmission channel responses having high reliability are supplied to the average value calculation section 32. The average value calculation section 32 calculates the average value of the inputted transmission channel responses and outputs the calculated average value, as a synthesized transmission channel response, to the distortion compensation section 18.

The other functions are the same as those of the embodiment shown in FIG. 1.

As can be seen, in this embodiment, the synthesized transmission channel response is obtained using only the transmission channel responses corresponding to the data segments having code error occurrence frequencies of the data segments equal to or lower than the threshold value. Thus, this embodiment can obtain the same advantages as those of the embodiment shown in FIG. 1.

Figure 11:
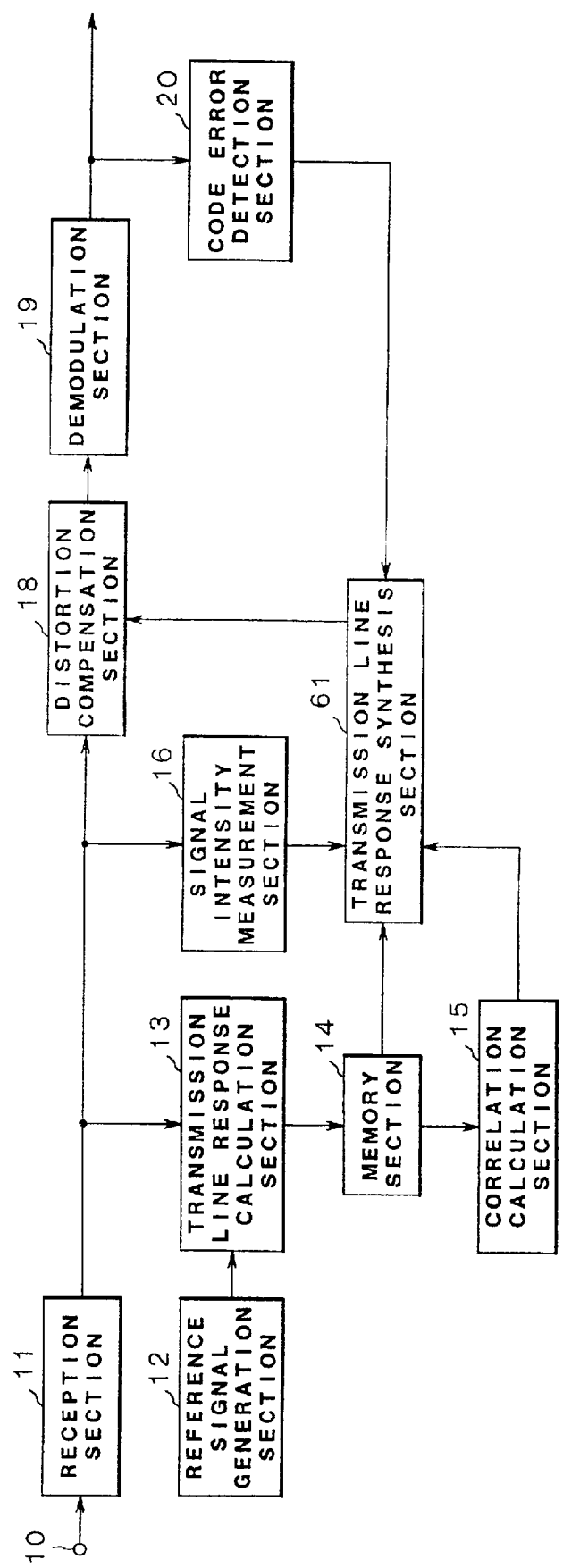
FIG. 11 is a block diagram showing another embodiment of the present invention.

FIG. 11 is a block diagram showing another embodiment of the present invention. In FIG. 11, the same constituent elements as those in FIGS. 1, 6 and 9 are denoted by the same reference symbols, which elements will not be described herein. In this embodiment, a synthesized transmission channel response is calculated using all the outputs of correlations, signal intensities and code errors for synthesizing transmission channel responses.

In this embodiment, a correlation calculation section 15, a signal intensity measurement section 16 and a code error detection section 20 are all provided and a transmission channel response synthesis section 61 is adopted. The transmission channel response synthesis section 61 decides on a weight synthesis method using all the outputs of the correlation calculation section 15, the signal intensity measurement section 16 and the code error detection section 20.

The other constituent elements are the same as those in the embodiments shown in FIGS. 1, 6 and 9.

In the embodiment constituted as stated above, the correlation calculation section 15 calculates correlations between the first transmission channel response and the second to n-th transmission channel responses, respectively, the signal intensity measurement section 16 measures the signal intensities of the respective preambles and the code error detection section 20 detects the code errors of respective data segments. The transmission channel response synthesis section 61 obtains a synthesized transmission channel response based on the outputs of the correlation calculation section 15, the signal intensity measurement section 16 and the code error detection section 20 and outputs the obtained synthesized transmission channel response to a distortion compensation section 18.

For example, the transmission channel response synthesis section 61 selectively uses one of the outputs of the correlation calculation section 15, the signal intensity measurement section 16 and the code error detection section 20 and obtains a synthesized transmission channel response by the method described in the corresponding embodiment stated above. In addition, the transmission channel response synthesis section 61 may output, as a synthesized transmission channel response, the average of transmission channel responses obtained by using at least two out of the correlation calculation section 15, the signal intensity measurement section 16 and the code error detection section 20. Further, the transmission channel response synthesis section 61 gives a predetermined weight to a synthesized transmission channel response obtained by using the respective outputs of the correlation calculation section 15, the signal intensity measurement section 16 and the code error detection section 20, to further obtain a synthesized transmission channel response.

As can be seen, this embodiment can obtain the same advantages as those in the above-stated embodiments.

Figure 12:
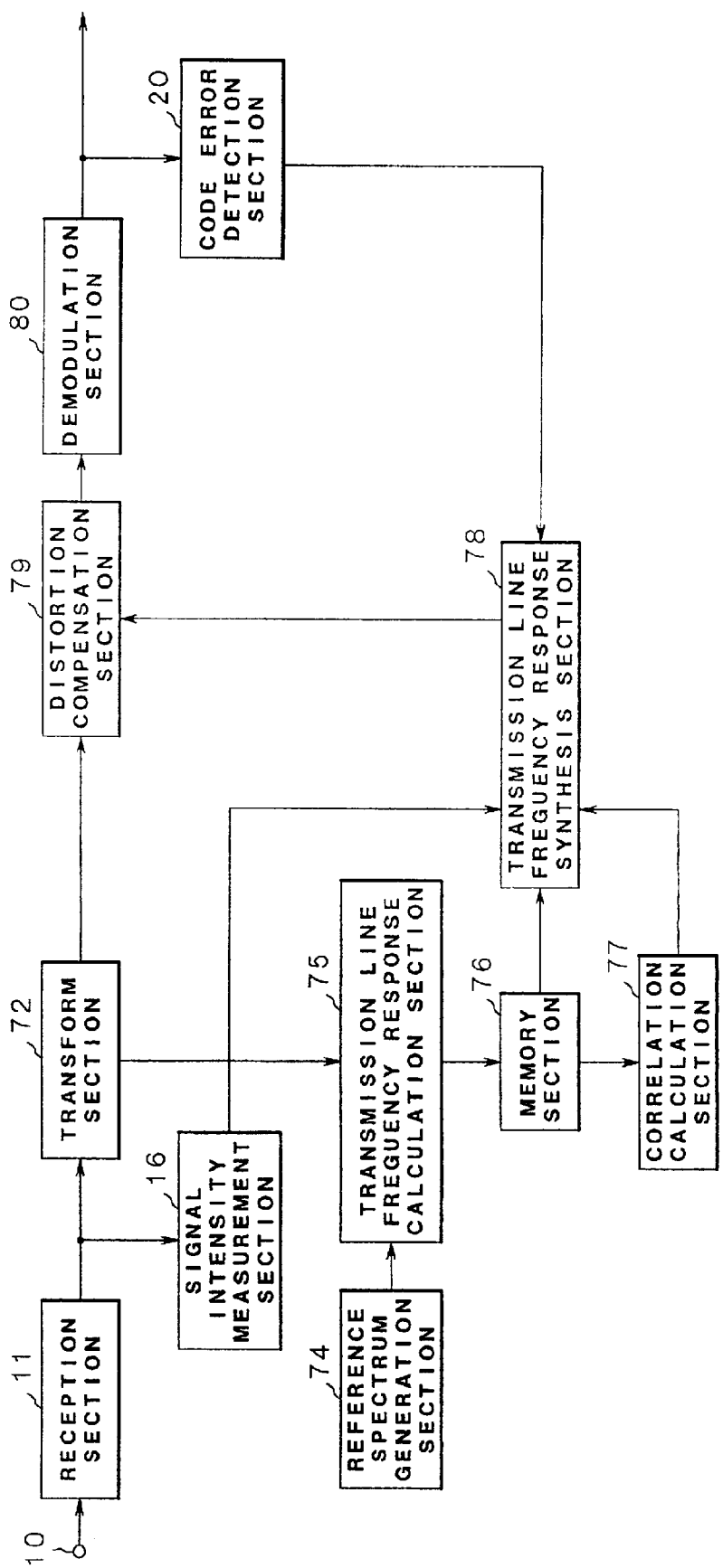
FIG. 12 is a block diagram showing another embodiment of the present invention.

FIG. 12 is a block diagram showing another embodiment of the present invention. In FIG. 12, the same constituent elements as those in FIG. 11 are denoted by the same reference symbols, which elements will not be described herein. In this embodiment, the constitution shown in FIG. 11 is applied to the compensation of a transmission channel distortion in a frequency region. In this embodiment, reception signals in the format shown in FIG. 2 are received.

The reception signals from a reception section 11 are supplied to a signal intensity measurement section 16 and also to a transform section 71. The transform section 72, corresponding to the reception signal, performs a transform processing represented by a fast Fourier transform (FFT) or the like and outputs reception frequency spectra to a transmission frequency response calculation section 75 and to a distortion compensation section 79.

A reference spectrum generation section 74 outputs the frequency spectra of transmission preambles as reference spectra corresponding to the reception frequency spectra. The transmission channel frequency response calculation section 75 calculates transmission channel frequency responses using the reception frequency spectra and the reference spectra. For example, the transmission frequency response calculation section 75 calculates the k-th transmission channel frequency response Hk(l) from the sample value Rk(l) of the frequency spectrum of the k-th preamble and the sample value S(l) of the frequency spectrum of a corresponding transmission preamble by the following formula (7):

$$H_k(l) = \frac{R_k(l)}{S(l)}. \quad (7)$$

A memory section 76 stores transmission channel frequency responses outputted from the transmission channel frequency response calculation section 75. There is a limit to the number of stored transmission channel frequency responses. If the number of inputted transmission channel frequency responses exceed the limit, the memory section 76 deletes the oldest transmission channel frequency response received and stores a new transmission channel frequency response.

A correlation calculation section 77 calculates and outputs the correlations between the first transmission channel frequency response calculated from the first preamble and the second to n-th transmission channel frequency responses calculated from the other preambles, respectively using the transmission channel frequency responses stored in the memory section 76.

The first to n-th transmission channel frequency responses are inputted into a transmission channel frequency response synthesis section 78 from the memory section 76. The transmission channel frequency response synthesis section 78 appropriately synthesizes the first to n-th transmission channel frequency responses based on the outputs of the correlation calculation section 77, a signal intensity measurement section 16 and a code error detection section 20, obtains and outputs a synthesized transmission channel frequency response to a distortion compensation section 79.

The distortion compensation section 79 performs a processing for compensating for a distortion given to the reception signal on a transmission channel to the reception frequency spectrum outputted from the transform section 72 using the synthesized transmission channel frequency response calculated by the transmission channel frequency response synthesis section 78, and a reception signal from which the distortion is eliminated to a demodulation section 80. The distortion compensation processing is conducted by the distortion compensation section 79 in accordance with the following formula (8) using H(l) calculated in the above-stated formula (7). In the formula (8), Y(l) indicates a reception signal after distortion compensation.

$$Y(l) = \frac{R_k(l)}{H(l)}. \tag{8}$$

The demodulation section 80 demodulates the transmission frequency spectrum after the distortion compensation outputted from the distortion compensation section 79, and outputs the code series of the demodulation signal.

Next, the operation of the embodiment constituted as stated above will be described.

The signal intensities of the preamble segments of the reception signals from the reception section 11 are measured by the signal intensity measurement section 16. At the same time, the reception signals are applied to the transform section 72, in which the reception signals are transformed into frequency spectrum signals. The transmission channel frequency response calculation section 75 obtains transmission channel frequency responses corresponding to the first to n-th preambles using the reference spectra by the above-stated formula (7).

Since the noise of a receiver is added to the reception frequency spectra, the transmission channel frequency response Hk(l) obtained by the above formula (7) is also influenced by the noise.

The first to n-th transmission channel frequency responses calculated are stored in the memory section 76 and then supplied to the correlation calculation section 77. The correlation calculation section 77 calculates the correlations between the first transmission channel frequency response and the second to n-th transmission channel frequency responses, respectively and outputs the correlations between the first transmission channel frequency response and the second to n-th transmission channel frequency responses to the transmission channel frequency response synthesis section 78.

Further, the transmission channel frequency response synthesis section 78 is applied with the signal intensities of preamble segments from the signal intensity measurement section 16 and also applied with code error detection results from the code error detection section 20. The transmission channel frequency response synthesis section 78 decides on a synthesis method for the first to n-th transmission channel frequency responses based on the correlation values, the signal intensities and the code error occurrence frequencies and outputs the decided synthesis method to the distortion compensation section 79.

The transmission channel frequency response synthesis section 78 either gives weights to the respective transmission channel frequency responses or appropriately selects them, synthesizes a plurality of transmission channel frequency responses having reliability improved by the weighting or selection and generates a synthesized transmission channel frequency response based on the correlation values, the signal intensities and the code error occurrence frequencies. Therefore, the reliability of the synthesized transmission channel frequency response is quite high and the influence of the noise of the receiver is considerably reduced.

The distortion compensation section 79 compensates for the distortion of the reception frequency spectra from the transform section 72 by the above formula (8) using the synthesized transmission channel frequency response. The reception signals after distortion compensation are demodulated and outputted by the demodulation section 80.

As can be seen, this embodiment can obtain the same advantages as those of the embodiment shown in FIG. 1.

Needless to say, the signal intensity measurement section 16 may measure signal intensities using the reception frequency spectra outputted from the transform section 72.

Furthermore, this embodiment shows a case of detecting all of the compensation values, the signal intensities and the code errors for synthesizing the transmission channel responses. It is obvious that the examples of FIGS. 1, 6 and 9 each of which shows detecting any one of them may be applied to the distortion compensation in the frequency region.

Figure 13:
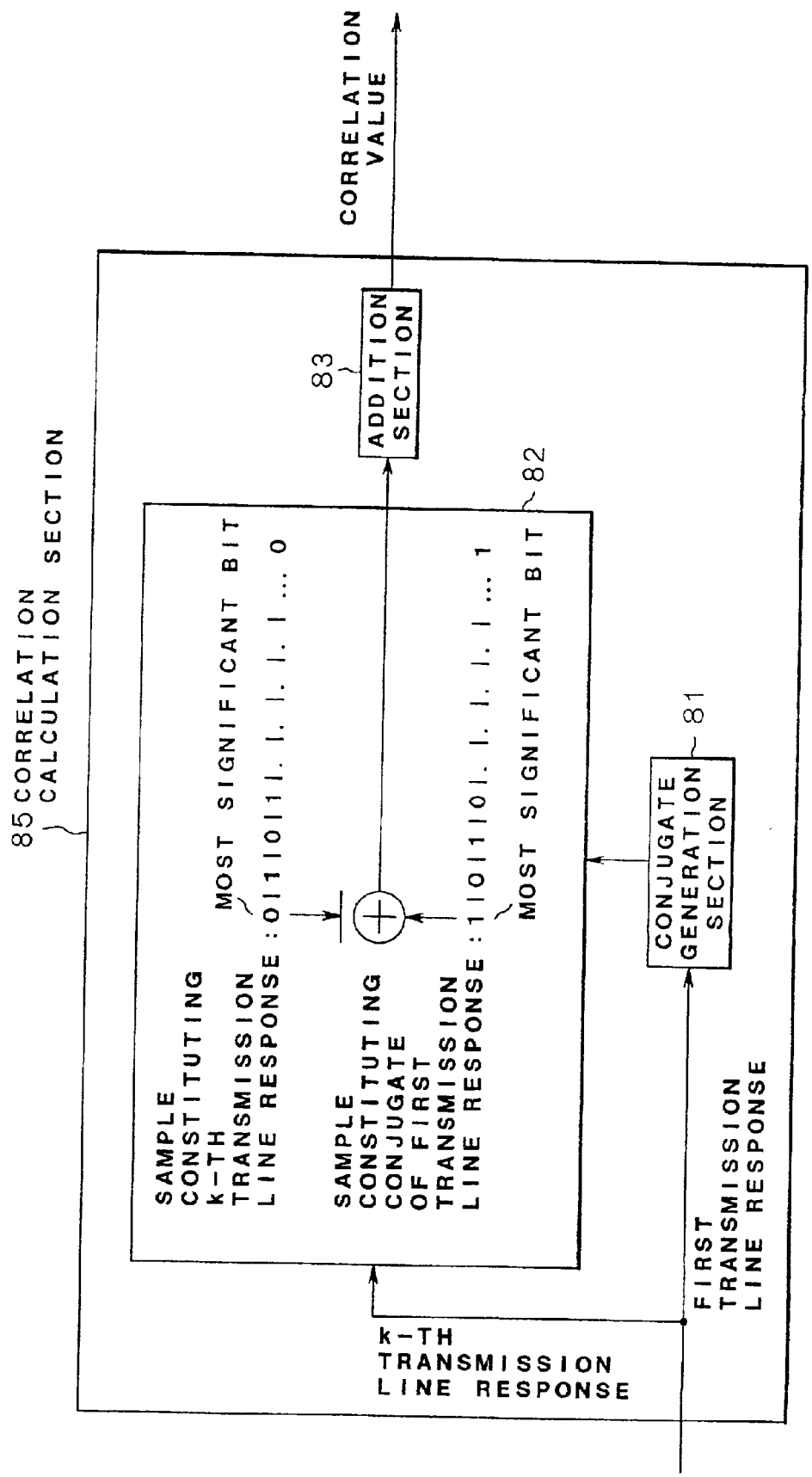
FIG. 13 is a block diagram showing a correlation calculation section adopted in another embodiment of the present invention.

FIG. 13 is a block diagram showing a correlation calculation section adopted in another embodiment of the present invention. This embodiment enables considerably reducing the calculation quantity of a correlation calculation section. This embodiment differs from the above-stated embodiments only in the constitution of the correlation calculation section.

The correlation calculation section 85 consists of a conjugate generation section 81, a logical operation section 82 and an addition section 83. The series of digital signals are inputted into the correlation calculation section 85. The digital signal series of the first transmission channel response is supplied to the conjugate generation section 81 and the digital signal series of the k-th transmission channel response is supplied to the logical operation section 82.

The conjugate generation section 81 obtains the complex conjugate of the digital signal series of the first transmission channel response and outputs the obtained complex conjugate to the logical operation section 82. The logical operation section 82 is applied with the complex conjugate of the digital signal series of the first transmission channel response outputted from the conjugate generation section 81 and the digital signal series of the second and the following transmission channel responses. The logical operation section 82 judges whether or not the logical values of the respective most significant bits (code bits) are coincident with one another, and outputs a logical value "1" if coincident and outputs a logical value "0" if not coincident.

The output of the logical operation section 82 is inputted into the addition section 83. The addition section 83 adds together the inputs of all the samples constituting the series and outputs an addition result as a correlation value.

In the embodiment constituted as stated above, the first transmission channel response is inputted into the conjugate generation section 81 of the correlation calculation section 85 and the second to n-th transmission channel responses are inputted into the logical operation section 82. The conjugate generation section 81 obtains the complex conjugate of the first transmission channel response and applies the obtained complex conjugate to the logical operation section 82.

The logical operation section 82 judges correlation using only the most significant bits of the two inputted digital signal series. That is, if the most significant bits are coincident, the logical operation section 82 judges that the correlation between the inputted digital signal series is high and outputs "1". If not coincident, the logical operation section 82 judges that the correlation is low and outputs "0". The addition section 83 adds the outputs of the logical operation section 82 for all the samples and outputs an addition result as a correlation value.

As can be seen, in this embodiment, only the most significant bits of the samples are used for the judgment of correlation. In this case, sufficient correlation judgment can be made. Compared with a case of calculating correlation values using all bits of the samples, a calculation quantity for calculating correlation values can be considerably reduced. Therefore, by adopting the correlation calculation section in this embodiment, it is possible to considerably reduce a calculation quantity at the time of calculating correlation values in the above-stated preceding embodiments.

While description has been given to a case of applying transmission channel responses to the correlation calculation section 85, it goes without saying that this invention is also applicable to a case of calculating the correlations between transmission channel frequency responses. Besides, not only the most significant bits but also only a predetermined number of bits from the most significant bit may be used for the calculation of correlations.

It is evident that according to the present invention, different embodiments can be constituted in a wide range based on the present invention without departing from the spirit and scope of the invention. The present invention should not be limited to specific embodiments but only limited by appended claims.

What is claimed is:

1. A reception apparatus comprising:
    a transmission channel response calculation section calculating a transmission channel response from a reception signal and a reference signal;
    a decision section determining reliabilities of a plurality of transmission channel responses calculated using reception signals received at different time periods, and deciding on a weight synthesis method;
    a transmission channel response synthesis section applied with the plurality of transmission channel responses calculated using the reception signals received at different time periods, weight-synthesizing said plurality of transmission channel responses based on said weight synthesis method decided by said decision section, and obtaining a synthesized transmission channel response; and
    a compensation section compensating for a distortion of the reception signal using said synthesized transmission channel response.

2. A reception apparatus according to claim 1, wherein said decision section gives a heavier weight for weight synthesis to the transmission channel response having higher reliability.

3. A reception apparatus according to claim 1, wherein said decision section selects only the transmission channel responses having reliability greater than a predetermined threshold value for weight synthesis.

4. A reception apparatus according to claim 1, wherein said decision section has a correlation calculation section calculating correlations between said plurality of transmission channel responses, determines reliabilities of said transmission channel responses based on correlation calculation results and decides on the weight synthesis method.

5. A reception apparatus according to claim 4, wherein said transmission channel response synthesis section obtains said synthesized transmission channel response by giving weights according to said correlations and weight-synthesizing said transmission channel responses.

6. A reception apparatus according to claim 4, wherein said transmission channel response synthesis section obtains said synthesized transmission channel response by an average value of said transmission channel responses having said correlations greater than a predetermined threshold value.

7. A reception apparatus according to claim 4, wherein said correlation calculation section calculates the correlations using only most significant bits of said plurality of transmission channel responses.

8. A reception apparatus according to claim 1, wherein said decision section has a signal intensity measurement section measuring signal intensities of respective signal segments of the reception signals corresponding to said plurality of transmission channel responses, determines reliabilities of said transmission channel responses based on signal intensity measurement results and decides on the weight synthesis method.

9. A reception apparatus according to claim 8, wherein said transmission channel response synthesis section obtains said synthesized transmission channel response by giving weights according to said signal intensities and weight-synthesizing said transmission channel responses.

10. A reception apparatus according to claim 8, wherein said transmission channel response synthesis section obtains said synthesized transmission channel response by an average value of said transmission channel responses having said signal intensities equal to or greater than a predetermined threshold.

11. A reception apparatus according to claim 1, wherein said decision section has an error detection section detecting errors of demodulation outputs of the reception signals corresponding to said plurality of transmission channel responses, determines reliabilities of said transmission channel responses based on error detection results and decides on the weight synthesis method.

12. A reception apparatus according to claim 11, wherein said transmission channel response synthesis section obtains said synthesized transmission channel response by an average value of said transmission channel responses having error occurrence frequencies obtained from said error detection results and equal to or greater than a predetermined threshold value.

13. A reception apparatus according to claim 1, wherein said transmission channel response calculation section calculates the transmission channel response from a frequency spectrum of said reception signal and a frequency spectrum of said reference signal; and said distortion compensation section compensates for the frequency spectrum of said reception signal using said synthesized transmission channel response.

* * * * *